No. 878,132. PATENTED FEB. 4, 1908.
F. G. GIES.
REVERSING GEAR.
APPLICATION FILED MAR. 22, 1907.
2 SHEETS—SHEET 1.
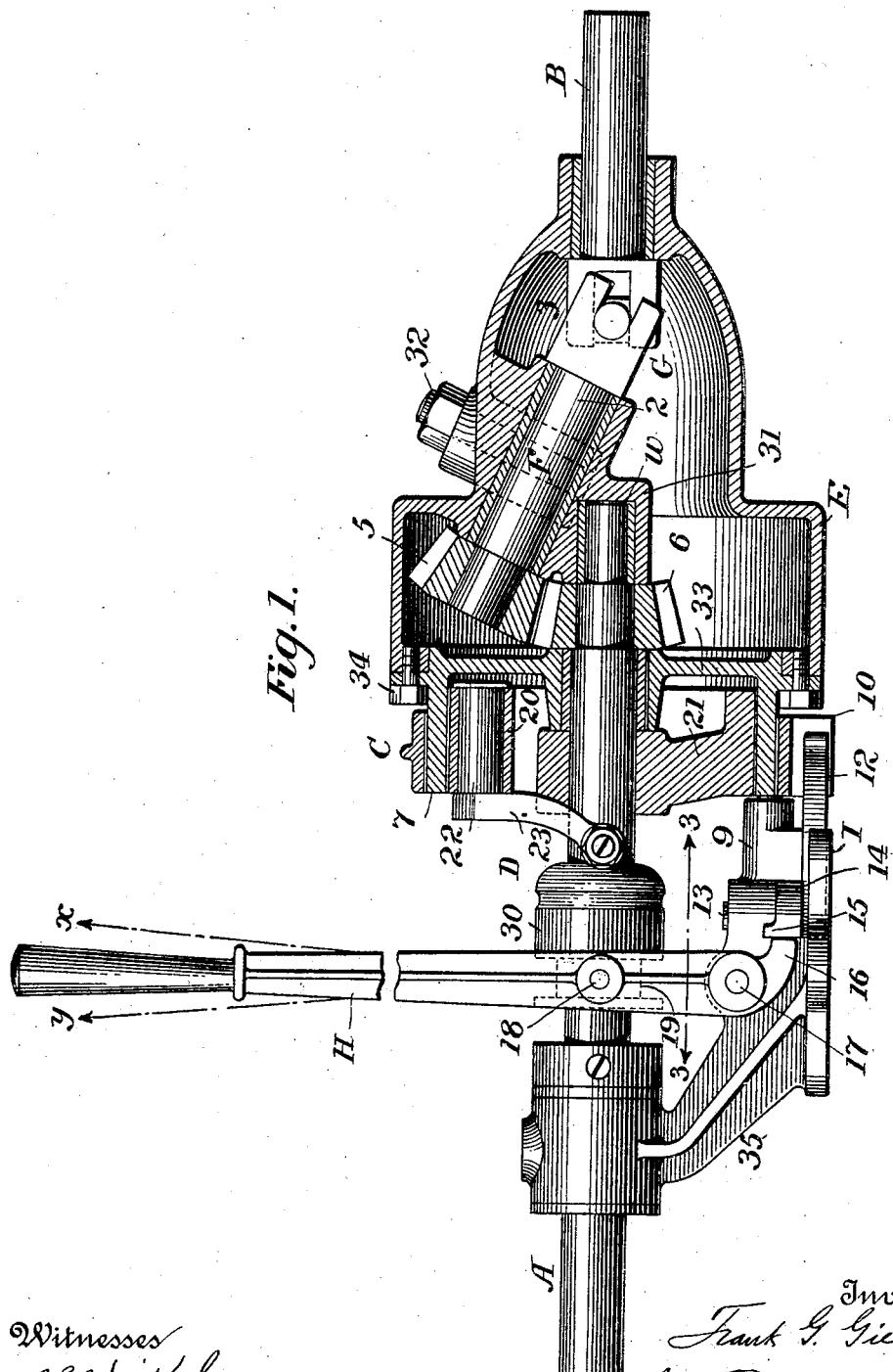

No. 878,132. PATENTED FEB. 4, 1908.
F. G. GIES.
REVERSING GEAR.
APPLICATION FILED MAR. 22, 1907.
2 SHEETS—SHEET 2.
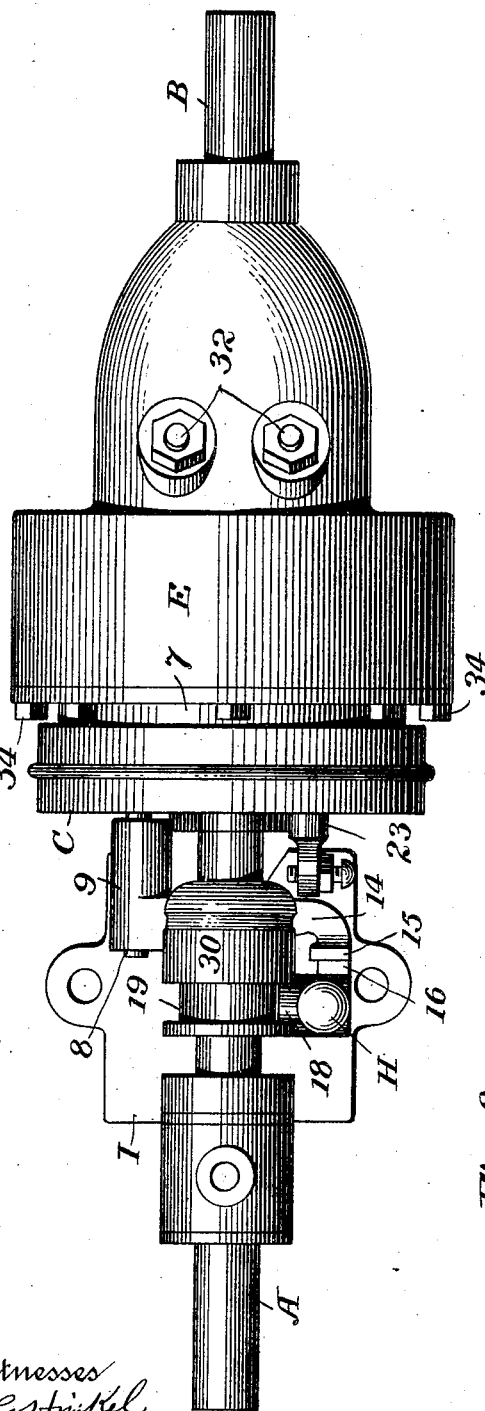
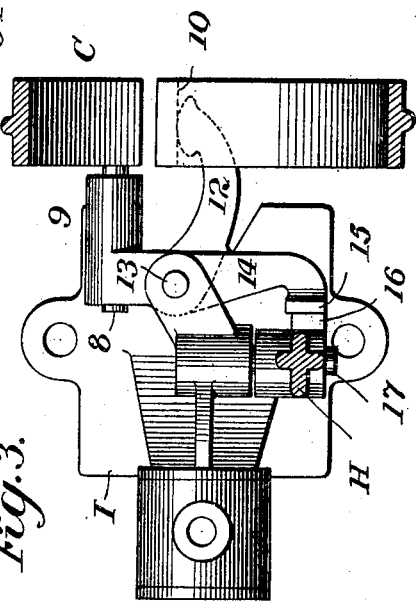
Witnesses
J. G. Stickel
J. J. McCarthy
Inventor
Frank G. Gies
by Foster Freeman Watson
Attorneys

UNITED STATES PATENT OFFICE.

FRANK G. GIES, OF DETROIT, MICHIGAN, ASSIGNOR TO GIES GEAR COMPANY, OF DETROIT, MICHIGAN, A CORPORATION OF MICHIGAN.

REVERSING-GEAR.

No. 878,132.     Specification of Letters Patent.     Patented Feb. 4, 1908.

Application filed March 22, 1907. Serial No. 363,855.

*To all whom it may concern:*

Be it known that I, FRANK G. GIES, a citizen of the United States, residing at Detroit, in the county of Wayne and State of Michigan, have invented certain new and useful Improvements in Reversing-Gears, of which the following is a specification.

The present invention relates to improvements in reversing gears and particularly to a gear adapted for motor boats, and will be described in connection with the accompanying drawings, in which, Figure 1 is a longitudinal sectional elevation of a gear constructed in accordance with the present invention; Fig. 2 is a plan view; and Fig. 3 is a plan partly in section on the line 3 3 of Fig. 1.

Referring to the drawing A, B, designate two shafts arranged in line but separated from each other, both of said shafts extending into a casing E so supported as to be capable of rotating with or independently of said shafts. Within the casing E is formed a bearing for a short shaft F arranged at an angle to the shafts A, B, and connected at one end with the latter by a universal joint G. To the opposite end of the shaft F is secured a beveled gear 5 which engages with a similar gear 6 secured on the shaft A within the casing E.

As above stated, the casing E is adapted to rotate about the axes of the shafts A, B, and a brake C is provided for holding said casing stationary when desired. A clutch D is also adapted to coöperate with the casing E for the purpose of connecting it to the shaft A and thereby connecting the shafts A, B.

As shown, the brake C comprises a split ring surrounding a flange 7 on the casing E, said ring having at one end ears to receive a pin 8 projecting from a boss 9 upon the base or bed plate I. The other end of said split ring is provided with a rib 10 against which bears one arm 12 of a two-armed lever which is pivoted upon a pivot 13 on the base or bed I, the other arm 14 of said lever having a rib 15 against which bears the short arm 16 of a hand control lever H pivoted to a pin 17 on the base or bed. The hand lever H is also provided with a stud 18 having a roller which extends into an annular groove 19 formed in a collar 30 mounted to slide on the shaft A and constituting one member or part of the clutch D. Said clutch also includes a split ring 20 which is connected to a hub 21 on the shaft A and adapted to be expanded into engagement with a flange 7 of the casing E by an eccentric stud 22 having an arm 23 projecting over the beveled or tapered end of the collar 30. When said collar is moved in the direction of the arrow in Fig. 1, it swings the arm 23 and rocks the stud 22 to expand the ring 20 and connect the casing E with the shaft A.

Either shaft A, B, may be employed as the driving shaft. Assuming that B is the driving shaft and the parts are in the position shown in Fig. 1, it will be seen that both the brake C and clutch D, are disengaged and the casing E is free to rotate with the driving shaft so that no movement is transmitted to the shaft A. If, however, the hand control lever is moved to the position indicated by the dotted line $x$, the clutch D will be operated to engage the casing with the shaft A and the movement of the driving shaft will be transmitted through said casing to the shaft A, thus imparting a direct forward drive to the latter.

By returning the hand control lever to the position indicated in full lines, the shaft A and casing E will be disconnected and the parts occupy the relative position shown in Fig. 1 in which the casing turns with the driving shaft but no movement is imparted to the driven shaft.

By shifting the hand control lever to the position indicated by the dotted line $y$, the two-armed lever 12, 14 will be rocked and the brake C operated to hold the casing E stationary and the shaft A will then be driven in a reverse direction to the driving shaft through the inclined shaft F and gears 5, 6.

As hereinbefore noted, the gear is particularly adapted for use in connection with motor boats and one of the advantages thereof is the ease with which the driven shaft may be disconnected from the driving shaft and thereby the propeller held stationary. This is of great advantage in many instances, for example where a boat is being used by fishermen and it is necessary that the propeller be held stationary while passing over nets which would be damaged if the driven shaft were rotated.

It will be seen that the casing E is provided with bearings for both shafts A, B, and rotates thereon and also has bearings for the inclined shaft or section F. Preferably the bearing for the latter shaft is divided so as to form a detachable cap 31, which is held in place by screw bolts 32 and has a socket $w$ for the reduced end of the shaft A. The flange 7 of the casing is also shown as formed upon a disk-like head or cap 33 bolted to the shell of the casing by bolts 34. An additional bearing for the shaft A is provided by an arm 35 rising from the base of the bed plate I.

It will be seen that with a gear constructed as herein described the transition from one direction to another is effected without shock or jar such as results from shifting gears into and out of engagement and further that as the clutch is a friction clutch the reversal as well as the throwing of the driving shaft into and out of gear is effected gradually. Further it will be seen that a multiplicity of gears between the driving and driven shaft is avoided and that those employed are effectively incased and protected and that much greater strength is secured than is possible when sprockets and chains are used as gearing.

It will be understood that while I have illustrated certain forms of clutch and brake devices any suitable clutching means effecting the same results may be employed.

Without limiting myself to the precise construction of parts shown I claim as my invention.

1. In a reversing gear, the combination with driving and driven shafts, of an intermediate inclined shaft connected to turn with the driving shaft, a casing having bearings for said shafts, gears on the inclined shaft and on the driven shaft engaging each other, a frame or support, and means for connecting said casing to turn with the driven shaft and also for connecting it immovably with the frame or support.

2. The combination in a reversing gear with separated driving and driven shafts in line with each other, of a casing supported to turn about both shafts, an inclined shaft turning in bearings in said casing and connected to turn with the driving shaft, a gear on the inclined shaft, a gear on the driven shaft engaging therewith, means for holding the casing immovable and releasing the same, and means for connecting the casing to and releasing it from connection with the driven shaft.

3. The combination of the shafts A, B, inclined shaft F connected to turn with the shaft B, gears between the shafts A and F, a support for the shaft F adapted to rotate about the axes of the shafts A, B, means for locking the said support to the base and for releasing the same, and means for locking the said support to and releasing it from connection with the shaft A.

4. The combination with the driving and driven shafts, casing, and intermediate gearing, of a clutch device between the casing and the driven shaft, a split ring encircling part of the casing and secured to a fixed bearing at one end, a two armed lever having one arm bearing upon the free end of the said ring, and a hand control lever bearing upon the other arm of said two armed lever.

5. The combination with the driving and driven shafts, intermediate gearing, and casing having a flange 7, of the split rings inside and outside of said flange, a sleeve upon one of the shafts for operating the inside split ring, a two armed lever adapted to engage the outside split ring, and a hand control lever having an arm adapted to engage one arm of the two armed lever and a stud adapted to engage said sleeve.

6. The combination with the shafts A, B, the casing turning about said shafts, the inclined shaft F, connected with the shaft B, and gears connecting the shafts A, F, of a bearing in the casing to support the shaft F, and a movable cap for said bearing having a socket for the end of the shaft A.

In testimony whereof I affix my signature in presence of two witnesses.

FRANK G. GIES.

Witnesses:
HOWARD E. PUTNAM,
HARRY D. MORTON.